United States Patent [19]
Foreman et al.

[11] Patent Number: 6,088,514
[45] Date of Patent: Jul. 11, 2000

[54] ENVIRONMENTAL DATA LOGGING SYSTEM

[75] Inventors: Richard L. Foreman, Santee; Frederick L. Wu, Pleasanton, both of Calif.

[73] Assignee: DeltaTrak, Inc., Pleasanton, Calif.

[21] Appl. No.: 08/997,227

[22] Filed: Dec. 23, 1997

[51] Int. Cl.[7] .................................................. G05B 21/00
[52] U.S. Cl. ...................................... 395/200.43; 364/134
[58] Field of Search ........................... 395/200.3, 200.42, 395/200.43, 200.46, 200.47, 200.48, 200.49; 364/131, 133, 134; 702/57, 85, 188, 189

[56] References Cited

U.S. PATENT DOCUMENTS

| | | | |
|---|---|---|---|
| 4,212,057 | 7/1980 | Devlin et al. ........................... | 711/151 |
| 4,689,740 | 8/1987 | Moclands et al. . | |
| 4,747,060 | 5/1988 | Sears, III et al. ........................ | 702/57 |
| 4,884,223 | 11/1989 | Ingle et al. ............................... | 702/41 |
| 5,553,267 | 9/1996 | Herlihv .................................... | 711/147 |
| 5,860,126 | 1/1999 | Mittal ...................................... | 711/167 |
| 5,896,292 | 4/1999 | Hosaka et al. ........................... | 364/468.15 |

*Primary Examiner*—Marc S. Hoff
*Assistant Examiner*—Craig Steven Miller
*Attorney, Agent, or Firm*—Theodore J. Bielen, Jr.

[57] ABSTRACT

A system for obtaining environmental data such as temperature, pressure, humidity, and the like which utilizes a data acquisition sensor. In the case of obtaining temperature data, the sensor may be in the form of a thermistor which measures a particular temperature value and generates a signal representing the same. A microprocessing unit receives the signal from the data acquisition device and sends the same to an erasable memory unit. A data collection computer receives the value signal directly from the erasable memory unit, since access to the erasable memory unit by the microprocessor is shielded. The data collection computer can communicate directly with the erasable memory without the need for generating a prior art RS-232 protocol.

12 Claims, 4 Drawing Sheets

ENVIRONMENTAL DATA LOGGING SYSTEM

BACKGROUND OF THE INVENTION

The present invention relates to a novel and useful data collection system.

In the prior art, a data logger normally works in conjunction with a programmer/down-loader personal computer, or a data collection instrument of some nature. The prior art systems use a conventional RS-232 serial data communication system which is a restrictive format. A data logger operating under the RS-232 serial format utilizes two lines, transmit (Tx) and receive (Rx). For example, when a personal computer communicates with the logger in the prior systems, the RS-232 protocol must be followed. In addition, data transmitted over the Tx and Rx lines utilize a fixed time interval for the rate of transmission, measured in bits per second. The standard rates under the RS-232 system begin at a standard of 2,400 bits per second and double for increasing data rates. For example, typical rate steps are 2,400, 4,800, and 9,600 bits per second. When logging environmental logging environmental parameters, logger products tend to use a maximum of 9,600 bits per second. In other words, 18 bit data word per millisecond or 1,000 data bytes per second would constitute the maximum rate of transmission under the RS-232 operation for a data logger. A deviation from these standard rate steps is not acceptable.

Moreover, a logger microprocessor utilizing the RS-232 data logging standard must include software procedures in a program memory (ROM) to handle the Tx and Rx lines. In addition, the logger microprocessor must generate the time critical intervals of the data rate. The received instructions or data from the host PC must be processed by the logger and stored in non-volatile memory devices, such as EEPROMS, to configure the operation of the data logger. At this time, the data logger microprocessor suspends all other operations when communicating with a PC. In other words, common terminal routines for the host PC exist to transmit and receive data from the RS-232 logger device. It should be noted that loggers of this type are supplied with the software programmed specifically to simplify data viewing and provide graphing functions by the manufacturers of such loggers.

Although the RS-232 serial data communication system works satisfactorily in certain cases, there are certain deficiencies which limit its specific application to data logger devices. As prior stated, the transfer of data takes place at a relatively low speed compared to the ability of a PC, which is capable of transferring data at 10 to 40 times the rate of an RS-232 device. Also, the logger unit must supply the power for transfer of data, which tends to limit battery life in self contained logging units. Further, there is a need to generate software which supports the RS-232 signal. This software "overhead" takes precious space in the memory portion of a data logger and it severely limits the capacity of the data logger to gather environmental values. In addition, the cost of the hardware necessary to generate an RS-232 format is relatively high. Moreover, data is not necessarily secure in an RS-232 system, since it is readily accessible unless safeguards are programmed into the software.

U.S. Pat. No. 4,689,740 describes a computer system which utilizes a clock bus wire and a data bus wire to transmit data. The object of the subject patent is to enable a single two wire line to be used for the interconnection of multiple stations.

Other two wire systems known as MICROWIRE (National Semiconductor) and S.P.I. (Motorola), are also adaptable to data logging operations.

A data transmission system which is particularly applicable to a data logging device without the use of an RS-232 serial format would be a notable advance in the instrumentation field.

SUMMARY OF THE INVENTION

In accordance with the present invention a novel and useful environmental data logging system is herein provided.

The system of the present invention utilizes a data acquisition sensor which is able to detect values of temperature, pressure, humidity, or the like. Once an environmental value is determined, the sensor generates a signal representing the value. The signal is sent to a microprocessing unit which, among other things, receives the signal. The microprocessing unit is also capable of generating data memory read and write functions. Also, the microprocessing unit calibrates the sensor for use.

Erasable memory means is also used in the present invention. The microprocessing unit sends the value signal to the erasable memory means for storage and retrieval. Such erasable memory unit may take the form of a EEPROM and the like. The erasable memory means may have separate areas that are segregated by functions. For example, the EEPROM may perform configuration of the data logger sensor, look-up table items, and store data from the sensor which is retrievable.

The EEPROM works hand-in-hand with a data collection computer which may be a personal computer (PC) or other data collection device. The computer receives the value signal directly from the erasable memory, through a parallel port, without using the RS-232 format and the intervention of the microprocessing unit. Means is provided for shielding access to the erasable memory means by the microprocessing unit while such data collection computer receives the value signal from the erasable memory means. In addition, such connection of the personal computer easily calculates and loads a look-up table located in the EEPROM while the sensor is operating and creating data to be loaded into the EEPROM. Modified tables generated by the data entering the EEPROM and acquired by the personal computer, of course, are capable of being displayed. The PC table, which has been calculated, is also found in the proper format (hexadecimal), such that the table may be used directly from the EEPROM without translation of the same through a serial RS-232. Thus, the computing power of the PC extends the minimal capability of the microprocessing unit in the area of memory retention and computation. In addition, downloading of logged data from the EEPROM to the PC presents at least a 20 percent additional memory space in the EEPROM due to the need not to transmit data from the EEPROM to the PC under the rigid protocol of the RS-232 system. Such shielding means may take the form of a busy line logic which may be programmed into the microprocessing unit.

The system of the present invention also includes means for isolating the EEPROM from an exposed connector or shorted connector. Such electronic "O" ring protects the EEPROM in certain environmental conditions such as immersion in salt water.

The system of the present invention also comprises switch means for activating the data acquisition sensor and microprocessing unit at selected time intervals independent of manual operation. In other words, the data logger of the present invention is capable of logging data, should the data logging unit be not activated by the operator. This "shadow"

logging feature assures the acquisition of data by the data logger system of the present invention if the data logger is employed in a transport vehicle, despite non-activation. Such a feature is easily included in the present invention by programming the same into the software of the microprocessing unit.

Since the system of the present invention includes means for shielding access to the erasable memory means by the microprocessing unit in order to allow the personal computer to communicate directly with the erasable memory means, timing is extremely important. The "busy" line to achieve this end has less priority in a logger of the present invention than taking measurements and storing data. The minimum time required for the PC to wait before sending data or receiving data from the EEPROM is programmed into the PC by software configuration. The result is that the PC will know exactly at what time to access the EEPROM. Accessing too soon would crash the sensor logger, while waiting too long would result in a very inefficient logging mechanism.

It may be apparent that a novel and useful environmental data logging system has been described.

It is therefore an object of the present invention to provide a data logging system which includes a direct memory access between the host personal computer and the erasable memory storage means, such as an EEPROM.

It is another object of the present invention to provide an environmental data logging system which requires a relatively low cost to produce.

Another object of the present invention is to provided an environmental logging system which requires a smaller memory capacity than prior systems using the RS-232 protocol.

Yet another object of the present invention is to provide a data logging system which permits the high speed data transfer between the erasable memory means and the personal computer associated with the data logging system for collecting and processing data.

Yet another object of the present invention is to provide an environmental data logging system in which information may be retrieved from the memory portion of the of the data logging system although the source of power or microcontroller unit is defective.

A further object of the present invention is to provide an environmental data logging system in which formatting between the personal computer and the erasable memory means is easily achieved.

Another object of the present invention is to provide an environmental data logging system which eliminates decoding and transmitting in the rigid RS-232 protocol when downloading log data from the erasable memory means to the data collection computer unit.

A further object of the present invention is to provide and environmental data logging system which exhibits high security against tampering.

Another object of the present invention is to provide an environmental data logging system which is capable of isolating the memory unit from the exposed connector to permit shorted connector operation in extreme conditions.

A further object of he present invention is to provide an environmental data logging system in which logging takes place although manual activation of the data logger has been omitted by error.

Another object of the present invention is to provide a data logging system in which the personal computer is capable of communicating directly with the erasable memory means and possesses an exact time for initiation of such communication resulting in a highly efficient data logging system.

The invention possesses other objects and advantages especially as concerns particular characteristics and features thereof as the specification continues.

For a better understanding of the invention reference is made to the following detailed description of the preferred embodiments thereof which should be referenced to the prior described drawings.

DETAILED DESCRIPTION OF THE PREFERRED EMBODIMENTS

Various aspects of the present invention will evolve from the following detailed description of the preferred embodiments thereof which should be referenced to the herein above described drawings.

Figure 1:
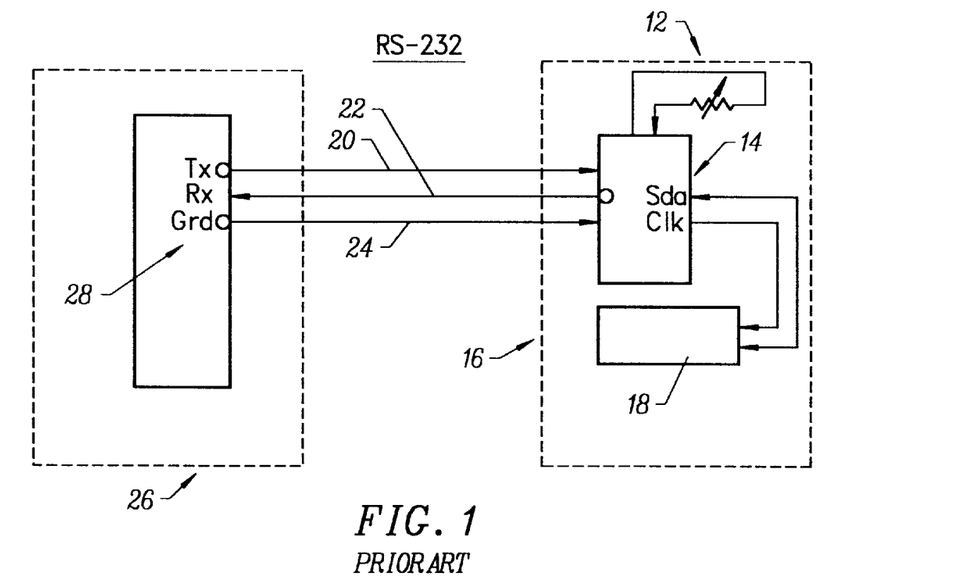
FIG. 1 is a schematic presentation of the RS-232 connection between a data logger and a personal computer serial port.
Figure 2:
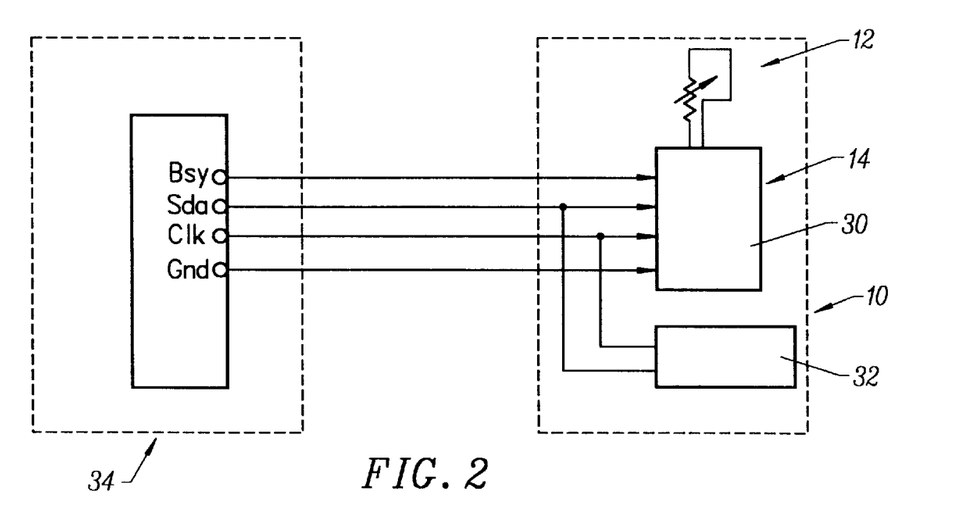
FIG. 2 is a schematic view of the direct access memory connection of the present invention between a personal computer and a data logger.

The invention as a whole is shown in the drawings by reference character 10. The data logger 10 is employed to record environmental parameters such as temperature, pressure, humidity, and the like. As shown in FIGS. 1 and 2, sensor 12 takes the form of a thermistor which measures temperature and translates the same into a signal that is sent back to a microprocessing unit 14 microprocessing unit 14 may take the form of a OKI semi conductor microprocessor. With reference to FIG. 1, it may be observed that a conventional data logger 16 is depicted in which the microprocessing unit 14 is connected to an erasable memory unit 18 by the data (Sda) and Clock (Clk) lines. Data from the microprocessing unit received from the thermistor 12 is transferred over two lines, the transmit (Tx) and receive (Rx) lines 20 and 22. A ground line 24 (GRD) is also employed in the prior art system. Host PC 26 includes a serial port 28 to accept the Tx, Rx, and GRD lines. Any received instructions or data from the host PC is stored in the EEPROM 18 which configures the operation of loggers 16 to the RS-232 protocol. The microprocessing unit 14 must cease all other operations, at this time, when communicating with PC 26 and require specific software to configure all data passing through Tx and Rx lines according to the RS-232 format. It has been found that this an extremely restrictive system since data rates are severely limited, higher power is required, and additional software is needed to achieve such transfer of information.

With reference to FIG. 2, it may be observed that the data logger 10 of the present invention employs a microcontroller or microprocessing unit 30 as well as an EEPROM 32. EEPROM 32 may be of the type similar to the 24LC65 manufactured by Microchip Technology, Inc. Most importantly, temperature measurements acquired by thermistor 12 are transmitted to microcontroller unit 14. From there, the data is passed to EEPROM 32. Thus, the logger reads and writes to non-volatile EEPROM 32 during normal operation. Microprocessor 30 however, must always read a "busy" line (Bsy) before entering the EEPROM. The busy line logic incorporated in the present invention tells the logger microprocessor 30 whether to continue such reading and writing functions or the enter a hold loop. Thus, the data (Sda), clock (Clk), and ground (Gnd) lines from personal computer or other data acquisition unit 34 is direct, without utilizing the MCU 14 or the RS-232 format. The software required to achieve this result is incorporated into this application as Appendix I.

Figure 3:
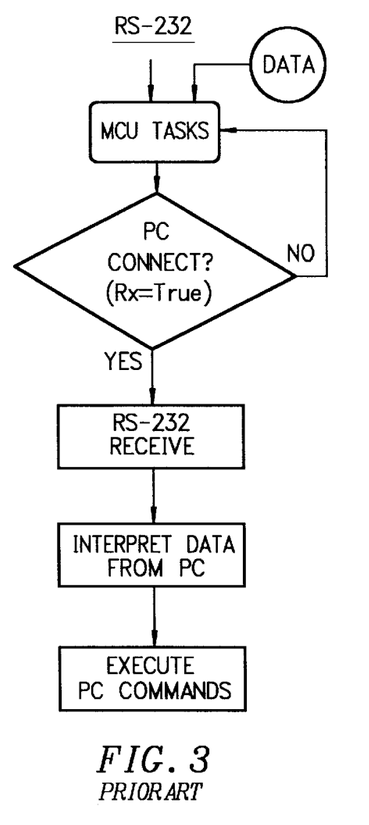
FIG. 3 is a prior art functional schematic presenting software methods in the prior art RS-232 connection protocol.
Figure 4:
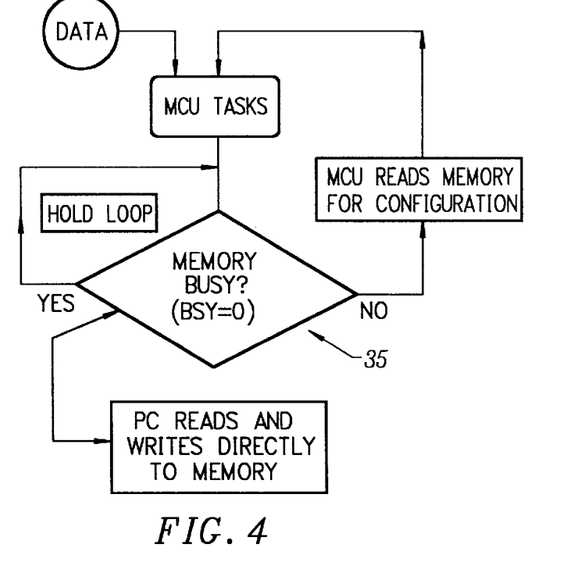
FIG. 4 is a schematic block diagram representing the direct access memory connection software functions of the present invention.

Referring now to FIGS. 3 and 4, a comparison of the functions performed by the prior art RS-232 connection and the functions determined by the software of the present invention, Appendix I, is shown. Again, the memory "busy" feature permits the PC 34 of the present invention to read and write directly to the memory unit, since the MCU must always pass through the memory "busy" step. Under such shielding means 35, if the memory "busy" is positive, the MCU goes into a hold loop. On the other hand, if the memory "busy" is not positive, the MCU may read and write the memory of the EEPROM in the normal manner.

Figure 5:
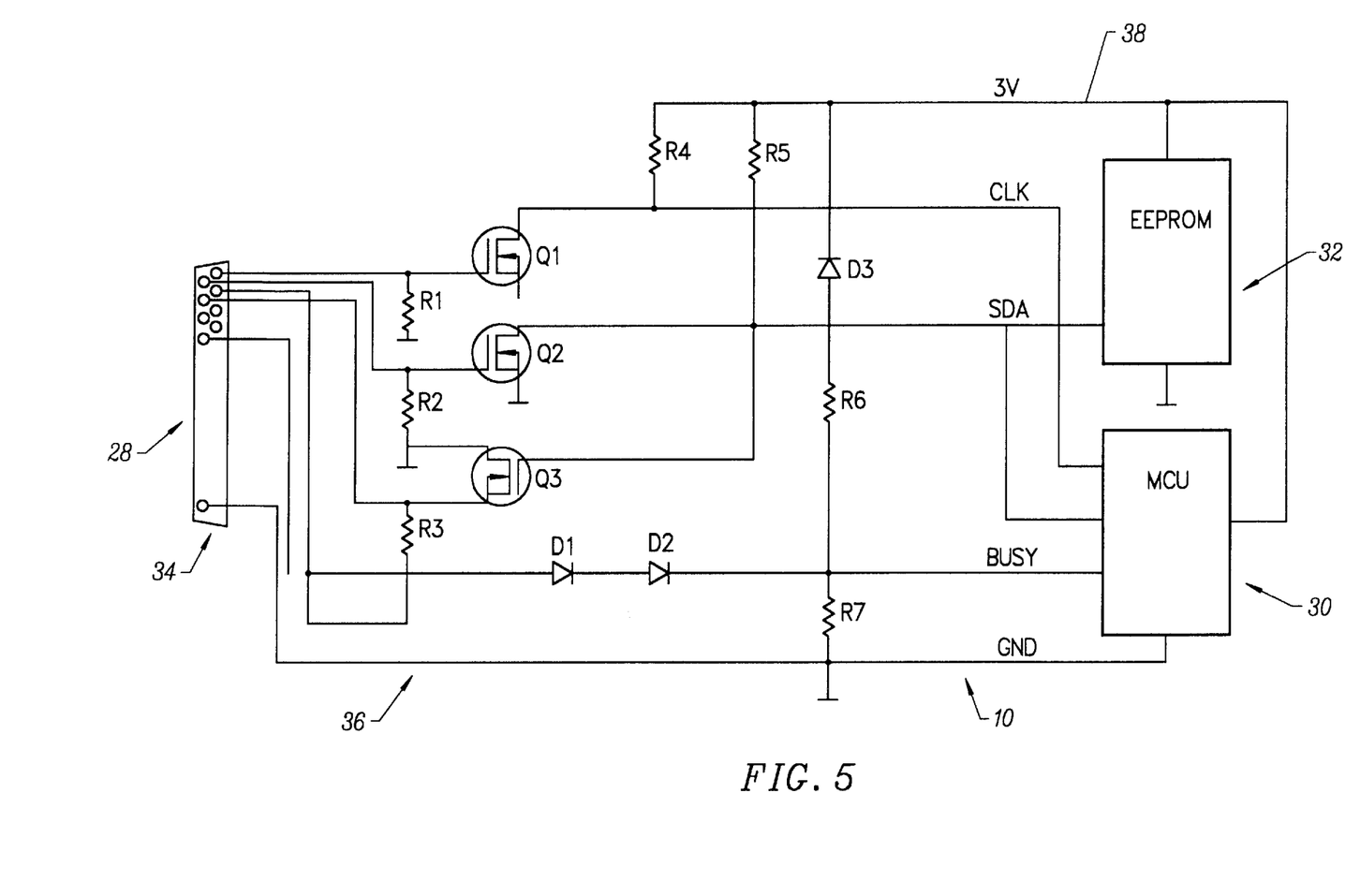
FIG. 5 is a electrical schematic of the memory interface circuit between a personal computer parallel port, the erasable memory means, and microprocessor of the present invention.

Turning now to FIG. 5, the logger 10 of the present invention interface 36 between computer 34 and the EEPROM 32 and MCU 30 is depicted. The data logger 10 operates on a 3 volt battery depicted by 3V line 38. All logic levels of the interface must conform to this voltage level. It should be noted that the parallel port logic levels of computers, such as PC 34, vary depending on types of computer designs, and physical design of the port, such as serial port 28 of PC 34 of the present invention. In certain cases, logic high voltages may range from 4.25 to 4.95 volts. Transistors Q1, Q2, and Q3 translate the levels which may be found in PC 34 by the use of pull-up resistors R4, R5, and R6. Transistor Q1 provides the memory clock signal. Q2 provides the data write signal while Q3 provides the data read signals. Blocking diodes D1 and D2 send the "busy" request signal to the MCU 30. MCU 30 responds by finishing any pending memory operations and then suspends further execution until the "busy" request line returns to a logic low. During such pause, the Sda and Clk lines to MCU 30 will be at high impedance Thus, PC 34 now controls the memory of EEPROM 32. The network formed by D3 and R6 provides replacement current to the 3 volt battery to compensate for additional drain from the battery caused by the communication link. Resistors R1, R2, and R3 are pull-down or ground reference resistors, and provide the electronic "O" ring function to protect EEPROM 32. Such resistors also provide an open drain condition of memory connections releasing the memory to the full control of the MCU 30. It should be noted that Q1, Q2, and Q3 are N-channel enhancement mode MOSFETS. Diodes D1, D2, and D3 are 1n4148 small signal diodes. Resistors R1–R7 are standard low precision units.

The following is a Table of typical components in the interface circuit of FIG. 5.

TABLE OF COMPONENTS

| ITEM | VALUE OR MODEL | SOURCE |
| --- | --- | --- |
| P.C. 34 | IBM Clone Intel 386, capacity or better | IBM; San Jose, California |
| R1 | 220 Kohm | Xicon; Taiwan, Taiwan |
| R2 | 220 Kohm | Xicon; Taiwan, Taiwan |
| R3 | 10 Kohm | Xicon; Taiwan, Taiwan |
| R4 | 10 Kohm | Xicon; Taiwan, Taiwan |
| R5 | 10 Kohm | Xicon; Taiwan, Taiwan |
| R6 | 100 Kohm | Xicon; Taiwan, Taiwan |
| R7 | 220 Kohm | Xicon; Taiwan, Taiwan |
| Q1 | RK7002T116 | Rohm; Kyoto, Japan |
| Q2 | RK7002T116 | Rohm; Kyoto, Japan |
| Q3 | RK7002T116 | Rohm; Kyoto, Japan |
| D1 | 1N4148 | Rohm; Kyoto, Japan |
| D2 | 1N4148 | Rohm; Kyoto, Japan |
| D3 | 1N4148 | Rohm; Kyoto, Japan |
| EEPROM 32 | 24LC65 | Microchip Technology, Inc. Chandler, Arizona |
| MCU 30 | 64164 | Oki Semiconductor; Tokyo, Japan |

Figure 6:
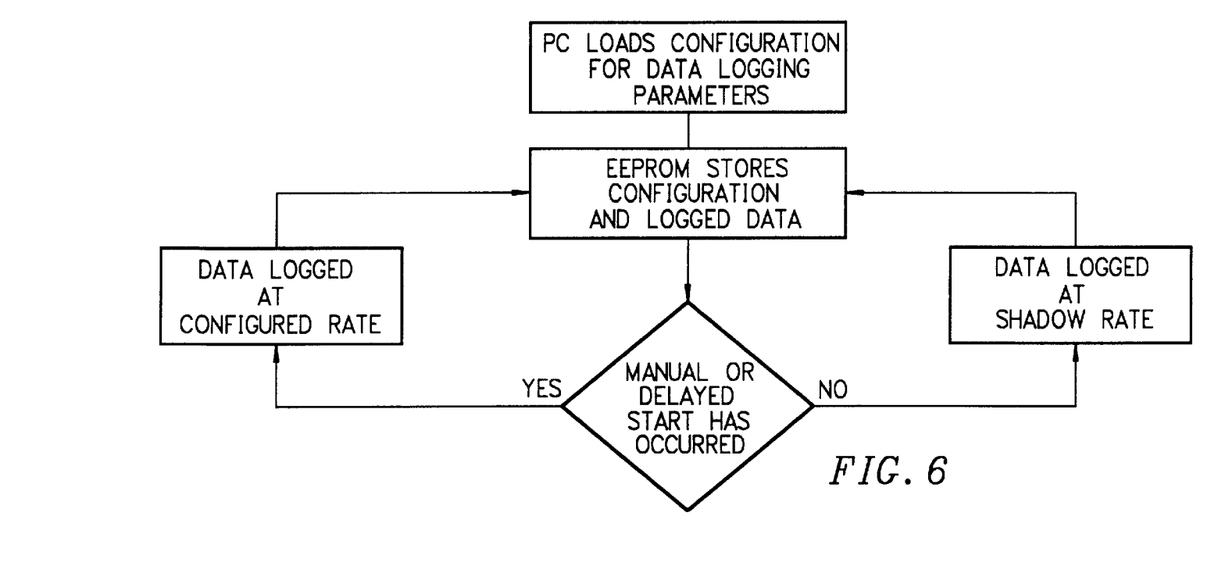
FIG. 6 is a block diagram representing the "shadow" logging function preformed in the software of the present invention.

A further enhancement of the present invention includes the provision of "shadow" logging of data. Such "shadow logging" function is also derived from Appendix I, the object code software loaded into EEPROM 30. In certain cases, an operator may forget to activate data logger 10 when data logger 10 is used to acquire values, such as temperature measurements, in a transportation vehicle. The "shadow logging" function will automatically take measurements according to the functional diagram shown in FIG. 6. It should be noted that the time interval for such "shadow logging" may be preprogrammed or altered through the use of PC 34.

To coordinate the shielding of the MCU 30 from communication with EEPROM 30, timing of entry of PC 34 to EEPROM 30 is necessary. Such auto-synchronization is also programmed into computer 34 and is represented by the software program enclosed as Appendix II hereto. That is to say, the PC 34 synchronizes to the internal speed of recording of MCU 30 and determines entry of PC 34 an appropriate amount of time after MCU 30 has been shielded from communication with the EEPROM. Such "wait time" must be accurate to prevent delays in the system 10 of the present invention and also to prevent crashing of EEPROM 32 by PC 34.

The following working example is meant to illustrate the operation of a data logger coming under the present invention, but is not deemed to limit the claims of the patent in any manner.

WORKING EXAMPLE

Figure 7:
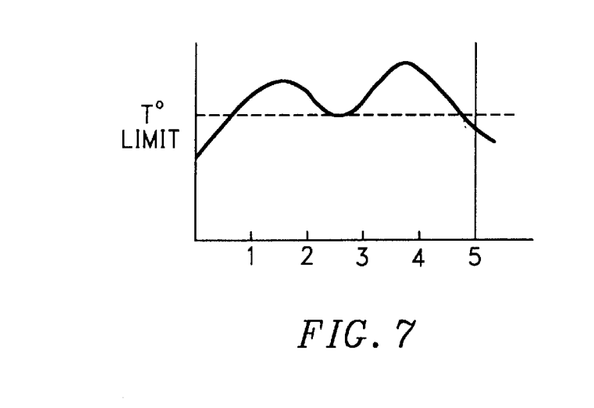
FIG. 7 is a graph representing temperature measured by data logger in the working example of the present invention.
Figure 8:
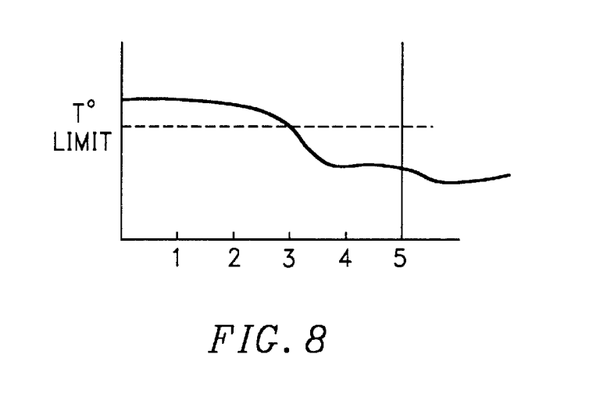
FIG. 8 is a graph representing the temperature measured by the data logger in the working example of the present invention.

A data logger, similar to the TQM-500 instrument manufactured and sold by DeltaTrak, Inc. of Pleasanton, Calif., was employed with the data logging system 10 of the present invention heretofore described. Thermistor 12 was used and an alarm temperature of 15 degrees centigrade was set. Sampling took place at one minute intervals for a total time of 5 minutes. A delay time for the alarm was set and the representation of the temperatures measured in FIG. 7 failed to trigger the alarm. However, when the delay was reset to a shorter time period the temperature measurements found in FIG. 8 and a maximum temperature of 13 degrees centigrade activated the alarm as required. Data transmission occurred between a PC and an EEPROM according to the system 10 of FIG. 2.

While in the foregoing, embodiments of the present invention have been set forth in considerable detail for the purposes of making a complete disclosure of the invention, it may be apparent to those of skill in the art that numerous changes may be made in such details without departing from the spirit and principles of the invention.

APPENDIX I

```
1
2
3    Program Machine Code for DeltaTRAK Inc. Data Logger
4    Reference Direct Access Memory
5
6    :02000000AB3E15
7    :02002000A9AA8B
8    :02002300A850E3
9    :02002600A850E0
10   :01002F00BB15
11   :10003B00BBAB3EAB3E3F065B4F666D7D077F6F777D
12   :10004B007C395E0040BEB5B03E9AD93E9B00209AEB
13   :10005B00E020A6A64C506D60A8932C9A1FA8935035
14   :10006B007E7FA89399367FA89395367FA893993676
15   :10007B007FA89395367FD399367FD39237933648A3
16   :10008B007FD3487FD3506D6A2C9ABE4DE22C9EEE1A
17   :10009B0077BE41E2506C692C9ABE40EE507860EE10
18   :1000AB00506C6A20A2A8D820A5ABD82C9AEE48A824
19   :1000BB00D120A4A3C622AZC63A30CE21A2CC3A1B8C
20   :1000CB00CE3A172F48D8BE40D83A002F48220AA95B
21   :1000DB001C2C9ABE4EA90823A5F5932DA4229FEDA7
22   :1000EB00294A239FA903284AA903922DA4229EFDE6
23   :1000FB00294A239EA903284ABD0DFA29A6BE46A9EB
24   :10010B00A63A002F402F422F442F46154AZ44AA9B6
25   :10011B00A62C9A1FA9A6209EA964219EA94E5060C9
26   :10012B007FA96699367FA96695367FA96699367F32
27   :10013B00A96627A5229EC4294A239EC9284A506C2A
28   :10014B0068A9A6299E503F63D6A93D50503A005F2F
29   :10015B00503E5E50625F4867E6259E209FA9A42112
30   :10016B009FA98F50647FA9A699367FA9A695367F44
31   :10017B00A9A699367FE62BA5229CF8294A239FCD96
32   :10018B00284AA949299F503F63D6C150643A005F62
33   :10019B00503E5E50665F4867E6259FB4BEB7BB28EE
34   :1001AB00A7BB952DA75038517834BF6F4A00EFA796
35   :1001BB00F490BF6F4ABF6F506DEE31B82409287DD4
36   :1001CB00506D62D2906FB822A3DC506C62DC66A2D9
37   :1001DB00B7506C60AA0464505E6EEE842F0A28A2DE
38   :1001EB0024A528A6BD0E823A3E2F883A002F8A3AC7
39   :1001FB00022FB0BD0B1BBD0B9C506C61E665220A38
40   :10020B00CE29042409BD0F5B2504ED0B923A3E2F7A
41   :10021B00883A002F8ABD0B2BBD0F97A9C729A5A71D
42   :10022B00DDBD090622A2F923A2F6B8A68EFD25A5EF
43   :10023B00A7DDBD0937B825A650805100BD0A1E6059
44   :10024B00805108BD0A1EB826A650845104HD0A1E53
45   :10025B005084510CBD0A1KBB23A3B8AAB6BD0B826D
46   :10026B002E802FB0BD0B9F2K822FB0BD0B9F22A2D5
47   :10027B00FFAA8B2ES42FB0BD0B9FCE862FB0BD0BKB
48   :10028B009FDC23A2D1DC2C852BD0B922A3DE2F1D0890
49   :10029B009F3ABC2FB0BD0B9F20A3F850407FF64842
50   :1002AB007FF6387FFS487FF6BC0C12B8Z0A2BB2127
51   :1002EE00A4AAF7BD0DF22CA4BE7CHE40B820A5CCB1
52   :1002CB00B820A4EE22AZE52C9BBE44DF29A5A7DD16
53   :1002DB00BB0906B8A68EED0B9CE925A5A7DDBD09FA
54   :1002EE0037AB1D29A6A7DDED0906AB1D20A4AB119E
55   :1002FB0024A4BD0DF22ZA2C9A68EBD0B9CCD25A5B3
56   :10030B00A7DDBD0937DD28A4HD0BFB29A5A7DDBDED
57   :10031B000906B8912DA4A328B8922DA4B82CA2BE7F
58   :10032B007CBE4CB8B9260A902D0B90ZD9E2D9F505C
59   :10033B006C6FB81315BEA7BEA89Z2D1C932D122D52
60   :10034B00142D152D16912D13902D172D102D119F4A
61   :10035B002D0424012C00BE731B551B552003BE7DA1
62   :10036B002DA2280127042C032DA12B0426042C03DA
63   :10037B002DA02A04247C982D30942D31902D323AC7
64   :10038B00FF2F7E287C972DA628A224A53AFF2F406B
65   :10039B002F422F442FA62F482F4A240993BD0F6D10
66   :1003AB003A00504C5FBD0D82BDZCAA3A3B2F883AE9
```

APPENDIX I-continued

```
67   :1003BB00002F8A2FB0BD0B1EED0B9CA31E29A5A71D
68   :1003CB00DDED090650743A505F50763A065FA33094
69   :1003DB0024A823A3E42EABACEA972DA750305178B3
70   :1003KD0034BF6F4A003FA7KB506D916F274B254AE7
71   :1003FB002448264B2409287D506D62C8FC23A6CDCS
72   :10040D0CAC7622A3D7506C62D766A2B7506C81ABA7
73   :10041B00FFS5BD0D823A3E2F883A002F8ABD0BZB0E
74   :10042B00BD0F97502361F4ABFF240991DD0F49AB6E
75   :10043B00FF506E90SF502361E9BD0B823A442F88BA
76   :10044B003A002FS8BD0D2E50B07ED9487E003A4420
77   :10045B002F883A002F8ABB0B1BBD0D9CABE42BA640
78   :10046B00972DA760789036003FA7F1606D906F24D1
79   :10047B000992BD0F49BD0B8250785E2FB03A402FC9
80   :10048B00883A002F8ABD0B1B507A5E2FB03A412F52
81   :10049B0088BD0B1B507C5E2FB03A422F88BD0B1BC7
82   :1004AB00507E5E2FB03A432F888D0B1BBD0D9CA11A
83   :1004BB00ADA228A241A252254A244A264B274BBD66
84   :1004CB000DF2504EBE60B9BD09BDDD09E2DE7F0008
85   :1004DB00A26324A6A1C7A1AD21A4EABD0DF2F5200C
86   :1004EB00A4F024A4F22BA4BD0DF229A5A7DDBD0913
87   :1004FB000622A2AD0723A2CCBD0969DA25A5A7DD8B
88   :10050B00D1A56EED0B9CBD0937BD0969BD099450A1
89   :10051B004EBE60E6BD09BDBD09E2E87F00A263AC3B
90   :10052B00DF2CA031AB4332AD7933ADA52CA131ADBC
91   :10053B00E032AE0133AE48B822A3C7CA23A6C2200D
92   :10054B00A2EF24ACZ4A53A002F402F422F442F467E
93   :10055B002F482F4A2CA4BE7C1FE6C220A4EC2AA64F
94   :10056B00C229A6C228A2A31EBD0DF224A5C22A396
95   :10057B00FEAD8223A6AD4220A2AD4221A2CC25A284
96   :10058B00BCE29A220A5E020A4D922A2D9AD42505455
97   :10059B00BD0E81AD42BD0DF2AD4222A3E9ED23A606
98   :1005AB00AD4220A2AD4222CA4BE8C1FAD4220A5AD16
99   :1005HB00C324A5HD0DF2AD4229A529A4BD0DF9207C
100  :1005CB00A4D05074D2S0705164HD0A1E3A002F481B
101  :1005DB00902C8AAD4223A6AD4220A5E9AD4222A4B0
102  :1005EB00F126A42BA4FC23A4F727A4FC21A4FC2A0A
103  :1005FB00A4BD0DF2AD4222A3C5C923A6AD4222A2DZ
104  :10060B00D123A2D1AD4220A5D6AD4222A4DADD235F
105  :10061B00A4E820A4E244A4AE4328A4AE4321A4FF61
106  :10062B0020A4FB25A424A4BD0DF2284B294BAD42DD
107  :10063B0028A4AE4329A424A4BD0DF2AD422BA5AD34
108  :10064B00422CA001D52CA101D5E826042C032DA00A
109  :10065B002A0427042C032DA12A042B04H826042CCE
110  :10066B0003BE4FFA2A0427042C03B34FAE92E32DA0
111  :10067B00A02A042B04AD2C20A2AE632DA12A042B9F
112  :10068B0004AD2C3D085124D93A802F2650525E2FG1
113  :10069B002895HD0D3B50C0BD0DB2HD0DC496HD0D13
114  :1006AB005A2E262FC22C282DC42C29EE732DC53AA9
115  :1006BB00002FC02FC62E802FAA2E8Z2FACBE4FCD5F
116  :1006CB00AF9850AA3405D87EBE6AD8487E8C340CBD
117  :1006DB00AF9860H10A002DAE2CAB1FAF0E2CAE50C5
118  :1006EB005C79F0AF982CAEA7A01DAF983A842F94ED
119  :1006FB00EEB73A00BF5F4A4A505D70BF5F4EED0840
120  :10070B0075AF9F2CAE595C91D6AF9879DAAF982C81
121  :10071B00AEA7A01DAF983A902F94BEB73A99BF5FAB
122  :10072B004A4A505D70BF5F4EED08752CAE01A7A045
123  :10073B00ADAF983A842F94BEB73A00BF5F4A4A5018
124  :10074B005D80BF5F4EED08752E902FB42E922FB8B5
125  :10075B0050B419737D0A4949492640BE48DE50B43E
126  :10076B00340B909119784C364890784C364S9078E9
127  :10077B004C36906F5-841973067C0A004D4D4D36E4
128  :10078B0040BE48C23EAC2CACBE4AAF7FDF3AFF2F17
129  :10079B00842F86B8B8BRB119552DA7BE782D88BE4H
130  :1007AB00B05555BE71595819782D89483A99782F9D
131  :1007BB008ABD9B82BD9B4B50B02CA71955445E2F35
132  :1007CB008848465E2F8A505A5E2F98ED0A32BD0B5F
133  :1007DB009CB8ED085124093A802F2650505E2F2813
134  :1007EB009121A5BE84BD0D3850C0BD0DB2ED0DC446
135  :1007FB009221A5HE84A55A3A002FC02FC62E262FB4
136  :10080B00C22E282DC4BEB0BE732DC528093A272F82
137  :10081B00983A502F883AD02F8AA382A2321DA84300
138  :10082B00A39C51B021A5BE14BEB52F843A00BF5F87
139  :10083B004A4ABF5F4A075D0A39C508021A5843A35
140  :10084B00FF5F48485FB8952E369A2D36B8BDBF7EF5
141  :10085B00BF70BE4AF390BF6F4ABF7EBF70BE4AF2F5
142  :10086B0090BF6F4ABF7E4E4EB4B82397A890279780
143  :10087B002096FF9590BF6F4A3A0260985F2E965B79
144  :10088B00CDB8A058CA50967FD6487F2096DA95905F
145  :10089B00BF6F4A3A0250985F2E965BE8EBA058E583
```

APPENDIX I-continued

| | |
|---|---|
| 146 | :1008AB00508863F167FB6B487FFB4B7FFB487F00F9 |
| 147 | :1008BB008382A34BA39C3A002F9850C74B70497B42 |
| 148 | :1008CB00CDD41FA9054CC789052E94BEB7A058516E |
| 149 | :1008DB0098A0583A50BF5DE5A905518095TDA719C1 |
| 150 | :1008EB0042BED1BF7052BE884652BF7852EE7746E9 |
| 151 | :1008FB0052BF6F4A3FA7A8EEA8C5B85083BE6FCCB9 |
| 152 | :10090B00F05046516A3A00BF5F4E4E5BBF5F504497 |
| 153 | :10091B0060F061E450808583F05080A5861BF048DF |
| 154 | :10092B009F3737376F50805170821EB85087BE6FFC |
| 155 | :10093B00FEA9625048516A3A00BF5F4E4E5ED5F5E0 |
| 156 | :10094B00504462E263D65084A5A3E2508485861D71 |
| 157 | :10095B00E2489F3737376F50845174A21EB821A6D7 |
| 158 | :10096B00F320A2F3BD0241B85083BE6FFAA9936195 |
| 159 | :10097B0003820DA98650805100821E500B51E382D9 |
| 160 | :10098B000DD350805108821EB822A6DE20A2DEBDD8 |
| 161 | :10099B000252B85087BE6FE4B85107A20DEF5084D6 |
| 162 | :1009AB005104A21E500F5187A20DFC5084510CA272 |
| 163 | :1009BD001EE85082EE6FC3C85113820DCF289E2AFS |
| 164 | :1009CB009E278EE1249E50175183A20DBF289E2661 |
| 165 | :1009DB0092B9KE1249EE8HD0328E7D805087DE6FBF |
| 166 | :1009DE00EDF2511B820DFA289F2A9F279FAA0C24D8 |
| 167 | :1009FB009F501F5187A20DCA289F269F2B9FCC2447 |
| 168 | :100A0B009F8B832DA770BF7ED5B81BF894C4E003F35 |
| 169 | :100A1B00A7D0B82C7CB0247C932D8734BF5F4A0091 |
| 170 | :100A2B003FA7E6B42D7CB83A002F86A34B50C74D89 |
| 171 | :100A3B0070497BAA41C71FE44CAA3AB0B150967E9D |
| 172 | :100A4B00CF487E00865E885EEE5E01DB5201520070 |
| 173 | :100A5B00865FB519B82B971BB82E961FE2HBB01F39 |
| 174 | :100A6B00E219B850883A0819585FB61DAA363E8864 |
| 175 | :100A7B0000AA3629011B2301192501B82A012C01D3 |
| 176 | :100A8B00DE9F290133D525011BB5250119B82501B5 |
| 177 | :100A9B00290125012A01B8561DE82A01EA26012959 |
| 178 | :100AAB00012501551DF42A01F626012901250155C1 |
| 179 | :100ABB001DAAC12A01C3260129012501551DCD2AD5 |
| 180 | :100ACB0001CF260129012501B8A27E55A27E55A290 |
| 181 | :100ADB007E55A27E55B82501260129012A013A022D |
| 182 | :100AEB00A7BC280929012A0126012501259AA250C7 |
| 183 | :100AFB004D701955A2AZA287A1DAAE12CBA2A22C84 |
| 184 | :100B0B008AA2A2AZ872C89A2A22C88A2A2AZ87B811 |
| 185 | :100B1B00A32A2ED2EE052A2A2F8252A2A287AB79BF |
| 186 | :100B2B008382A2ED29012A01260125019AA2A22C5A |
| 187 | :100B3B008BBE81A2A2AZ87AZD4BEH1A2D42FB08940 |
| 188 | :100B4B00A382A2EDZ9012A01260125019AA2A25016 |
| 189 | :100B5B004D701B56A2A2A2873AB0EEB6A2D4EED1AD |
| 190 | :100B6B00A2D45F480048F3F6A299E72901002501BA |
| 191 | :100B7B00260129012A01B82300C6D526002300CC63 |
| 192 | :100B8B00D32300D0D32504B8A20029042409287DB7 |
| 193 | :100B9B00C22A00B82E8C2F882E8E2F8A504C346F81 |
| 194 | :100BAB00A31B2ACB1E4EF4ACA3508C7EACA3487EE1 |
| 195 | :100BBB00ACA3487EACA3487E5123BF606D62ACA3EF |
| 196 | :100BCB0068D161ACA365504C7001BED133DAE6510E |
| 197 | :100BDB00221BBF7A1DE6BEB06FACA321A3AC125093 |
| 198 | :100BEB004A7EF2487E004C5E2FB03A452F8838D081 |
| 199 | :100BFB002F8A504D6FA31B50285E2F8C502A5E2FCF |
| 200 | :100C0B008E90504C6FACA322A3FC2409Z87D506812 |
| 201 | :100C1B0062E166BD02B7506C61D565220AED24090D |
| 202 | :100CZB00A764A3823A3E2F883A002F8AA32BA78768 |
| 203 | :100C3B00D5247C902D30902D31912D32287C3A008B |
| 204 | :100C4B002F402F42F442F462F482F44AA39C2A0474 |
| 205 | :100C5B002B04902D2AZD2B2B4B240924A724092858 |
| 206 | :100C6B007D20A7E824A7A3823A3E2F883A002F8A3B |
| 207 | :100C7B00504D6FA32BA39C220ADC240929043A01B3 |
| 208 | :100C8B00A78CZ50421B0D3DCBD0330244A254AAC04 |
| 209 | :100C9B006820B0AC68BC033E90504D6FB83A202F23 |
| 210 | :100CAB00883A002FA8504DBE30A34B2CB02DA35049 |
| 211 | :100CBB00B0BE0B70BE0236ACBC50285E2F8C502AD7 |
| 212 | :100CCB005E2F8E3A282F88834B50B0BEZB70BE01FF |
| 213 | :100CDB0036D63A30ZF88A34B50B0BB0B70BB0336BE |
| 214 | :100CEB00E53A382F88A34B50D0BE0B70BB0436F4D8 |
| 215 | :100CFB00504C3A005F3A482F88A34B50B0BB0B7054 |
| 216 | :100D0B00BE0536C83A00504A5F3A002FB03A442F1E |
| 217 | :100D1B0088A31B3A002FE03A452F88A31B2CA25453 |
| 218 | :100D2B0054BE73BEB12CA32FB03A202F99A31BB88F |
| 219 | :100D3B002D2B3A002F202F222D242734A05126A50E |
| 220 | :100D4B00932D2A287D202AD922A5CE242AB9BB8D65 |
| 221 | :100D5B002B3A002F262F282734A05126A5912D2A78 |
| 222 | :100D6B00287D202AF622A5EB242AB9B8952DA719A0 |
| 223 | :100D7B0070497D0A4D363FA7AD7BB8932DA719970EF |
| 224 | :100D8B00BF7D0A364A3FA7CAB8952DA719704906E8 |
| 225 | :100D9B007C0A4D363FA7D8BB932DA719BF704A06CA |
| 226 | :100DAB007C0A363FA7E7B82E205F48482E225F48C3 |
| 227 | :100DEB00482C24BE7736BE30B8952DA750B0903650 |
| 228 | :100DCB003FA7CA50B0A57750B15E2F20485E2F22A7 |
| 229 | :100DDB004848701F1F2D24B8942DA750B0346D4870 |
| 230 | :100DEB003FA7E91B1F19B820A2B820A5F9B82C7C86 |
| 231 | :100DRB002D9D247C23A4F0264A2B4A20A4D122A685 |
| 232 | :100E0B00CDDE500CAE5621A6D5D95008AE5D284B81 |
| 233 | :100E1B00254BE2244B294B3A002F4850263AFF5FD3 |
| 234 | :100E2B004C4C5FAF1E22A4AE4D2A4A274A20A4AEDB |
| 235 | :100E3B004522A6AE42AE1E5004D621A6CAAE19500C |
| 236 | :100E4B0000DD264A28AA20A4DB5074244B294EE3B0 |
| 237 | :100E5B0050702B4B254BAE8722A2AE873A302F48D5 |
| 238 | :100E6B00BEB4BEB73AEE50265F4C4C4A4ABF704EEA |
| 239 | :100E7B0052BF705FAF1E2C7C2D9D247C21A2AEC176 |
| 240 | :100E8B003A1B2F4B70BE4FD5AF1E932D9C512C197A |
| 241 | :100E9B0070067C0A00BF6F48004A003F9CDB922D16 |
| 242 | :100EAB009C502C19347D0A4CSF48003F9CEF701DF1 |
| 243 | :100EBB00FE1F6F502CCB3A172F4870BE4FCBAF1E77 |
| 244 | :100ECB0051245EBF5F48484A4ABF57045E19BF7D35 |
| 245 | :100E0B000ABF6F4ABEB0BF7ABFGF1DAF10922D9C79 |
| 246 | :100EEB00512694BF6F4E4E3A00BF5F4C4C19BF70EA |
| 247 | :100EFB008D0A00BFGF484A3F9CAEF95026341FCD88 |
| 248 | :100F0B009E379F6FDC5027701FDC9E37701FDC9E57 |
| 249 | :100F1B006F5024BEB42FA8932D9C5046B12EA8BE63 |
| 250 | :100F2B00B6703EA80046HE24506EB7005EB5BEA09C |
| 251 | :100F3B005FBEA74C4C3F9CAF272C9D2D7CB82DA79B |
| 252 | :100F4B0028043A01A78C24043A38A78C3FA7CBB8C6 |
| 253 | :100F5B0028043A01A78C2404B829043A01A78C254C |
| 254 | :100F6B0004B82DA728043A01A78C24043A22A78C95 |
| 255 | :100F7B0029043A01A78C25043A22A78C3FA7AF6F0F |
| 256 | :100F8B00B8BEB64CD34DD3B89F1FD4CE20B0DDBC6A |
| 257 | :100F9B00037F220AED21B0E4EDBD033024A6244AE1 |
| 258 | :050FAB00254AA39CE8DB |
| 259 | :00000001FF |
| 260 | |
| 261 | |
| 262 | |
| 263 | |
| 264 | |
| 265 | |
| 266 | |
| 267 | |
| 268 | |
| 269 | End of File |

```
Sub synco ( )
'This general procedure will be used to calculate the
'optimal syncronization timing between the L3.0 and
'the base PC processing speed. It will return a number of counts
'the PC should make on SDA line not active(High) before
'making any attempt for direct bus access.
'-----------------------------------------------------------------
Dim Ctr&, Start&, finish&, bet&, Dat%, acty&
'Ctr& - counter for all High level checks on SDA line
'Start& - start delay
'Finish& - stop delay
'Bel& - Dynamic time variable between Start& and Finish&
'Dat% - Read variable, used for George's byte read
'acty - final max counter
'Suggest to the user to prepare for the process
If MsgBox("Please, connect TempStor-3 to Your computer !" + Chr(13) +
"At toSync will last 53 sec ! Please, DO NOT interupt!", 48 + 1, "Au
toSync . . . ") = 2 Then End
'***** Show activity gauge
Meter.Show
Meter.Gauge1.Max = 53 '53 sec max range
Meter.Caption = "Auto Sync . . . "
Meter.Enabled = False 'prevent interuption
'***** Start read procedure
out controlportaddr, &HF3 'request the bus
Meter.Label1.Caption = "Line request . . . 13 sec. "
Meter.Gauge1.Value = 1
Meter.Refresh
```

-continued

```
Start& = Timer           'wait for bus free 13 sec
Do
finish& = Timer
If finish& > bet& Then
   bet& = finish&           refresh the gauge every 1 sec
      Meter.Gauge1.Value = (bet& - Start&)
      Meter.Refresh
   End If
DoEvents
Loop Until finish& - Start& > 13
Meter.Label1.Caption = "Line released . . . 15 sec"
Meter.Refresh
Call BYR65 (&HA0, 0, &H3D, Dat%) 'check Georges byte at 3Dh
Call L30CFG(1, 2)       'action write, mode synco, fast log
If (pEr% = 1 Or Dat% <> &HA5 Then
MsgBox "Syncronization was not successfull !" + Chr(13) + "Please, c
heck for bad connection !", 16, "Fatal Error . . . "
End
End If
out controlprotaddr, &HFF 'release the bus
Start& = Timer 'Waiting for logger response time 15 sec
Do
   finish& = Timer
   If finish& > bet& Then
   bet& = finish&          'refresh the gauge every 1 sec
      Meter.Gauge1.Value = (bet& - Start&) + 13
      Meter.Refresh
   End If
   DoEvents
Loop Until finish& - Start& > 15
Meter.Label1.Caption = "Synchronizing . . . 25 sec"
Meter.Refresh
Start& = Timer
bet& = Start&
Do
   finish& = Timer
   If finish& > bet& Then 'refresh the gauge every 1 sec
      bet& = finish&
      Meter.Gauge1.Value = (bet& - Start&) + 28
      Meter.Refresh
   End If
   If (Inp(StatusPortAddr%) And &H8) <> 8 Then
      Ctr& = Ctr& + 1
   Else
      If acty < Ctr& Then
         acty = Ctr&
      End If
      Car& = 0   'clear the counter
   End If
Loop Until finish& - Start& > 25
Meter.Label1.Caption = "Updating L30.INI . . . "
Meter.Refresh
Call delay(2)
Meter.MousePointer = 11
Setup(0) = acty& + 200    'Bus activity counter
Setup(1) = acty& + 1200   'Bus busy time out
Call FBI_O(5)             'update set up file L30.exe
Meter.MousePointer = 0
Meter.Label1.Caption = "Synchronization is completed !"
'Check for activity on the bus
Call buschk(OpEr%)
If OpEr% <> 0 Then Exit Sub
'*** Disable logging
Call L30CFG(1, 3)
Meter.Enabled = True
Unload Meter
End Sub
```

What is claimed is:

1. An environmental data logging system comprising:

a. a data acquisition sensor for measuring the value of an environmental parameter and generating a signal representing said value;

b. a microprocessing unit said microprocessing unit receiving said signal from said data acquisition device;

c. erasable memory means said microprocessing unit sending said value signal to said erasable memory means;

d. a data collection computer receiving said value signal directly from said erasable memory means;

e. means for shielding access to said erasable memory means by said microprocessing unit while said data collection computer receives said value signal from said erasable memory means; and f. switch means for activating said data acquisition sensor and said microprocessing unit at selected time intervals, said switch means being programmed for operation independent of manual activation of said data acquisition sensor.

2. The system of claim 1 which additionally comprises said microprocessing unit includes means for calibrating said data acquisition sensor.

3. The system of claim 2 in which said erasable memory means further comprises means for creating a data look-up table, readable by said data collection computer.

4. The system of claim 1 which further comprises means for generating a memory clock signal to said erasable memory device.

5. The system of claim 1 which further comprises means for isolating said erasable memory from connector shorting.

6. The system of claim 5 which additionally comprises said microprocessing unit includes means for calibrating said data acquisition sensor.

7. The system of claim 6 in which said erasable memory means further comprises means for creating a data look-up table, readable by said data collection computer.

8. The system of claim 7 which further comprises means for generating a memory clock signal to said erasable memory device.

9. The system of claim 8 which further comprises means for isolating said erasable memory from connector shorting.

10. The system of claim 1 which further comprises delay means for preventing communication of said data collection computer with said erasable memory means for a selected time period.

11. The system of claim 10 which further comprises switch means for activating said data acquisition sensor and said microprocessing unit at selected time intervals.

12. The system of claim 11 which further comprises means for isolating said erasable memory from connector shorting.

* * * * *